(12) United States Patent
Kim et al.

(10) Patent No.: US 7,854,010 B2
(45) Date of Patent: Dec. 14, 2010

(54) METHOD AND APPARATUS FOR SEARCHING RIGHTS OBJECT AND MAPPING METHOD AND MAPPING APPARATUS FOR THE SAME

(75) Inventors: Yeo-jin Kim, Suwon-si (KR); Yun-sang Oh, Seoul (KR); Sang-gyoo Sim, Suwon-si (KR); Kyung-im Jung, Seongnam-si (KR); Ji-soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 878 days.

(21) Appl. No.: 11/747,346

(22) Filed: May 11, 2007

(65) Prior Publication Data

US 2007/0266440 A1    Nov. 15, 2007

Related U.S. Application Data

(60) Provisional application No. 60/799,652, filed on May 12, 2006.

(30) Foreign Application Priority Data

Apr. 27, 2007    (KR) ...................... 10-2007-0041399

(51) Int. Cl.
G06F 11/00    (2006.01)
G06F 12/14    (2006.01)
H04L 9/00    (2006.01)

(52) U.S. Cl. .............................. 726/26; 726/27; 726/28; 726/29; 726/30; 713/168; 713/169; 713/170; 713/171; 713/172

(58) Field of Classification Search ..................... 726/26
See application file for complete search history.

(56) References Cited

U.S. PATENT DOCUMENTS

| 2005/0216419 | A1* | 9/2005 | Lee et al. ....................... 705/59 |
| 2006/0006220 | A1 | 1/2006 | Kwon et al. |
| 2006/0059194 | A1 | 3/2006 | Oh et al. |
| 2006/0062426 | A1 | 3/2006 | Levy et al. |

* cited by examiner

*Primary Examiner*—Longbit Chai
(74) *Attorney, Agent, or Firm*—Sughrue Mion, PLLC

(57) ABSTRACT

A method and apparatus for searching a rights object and a mapping method and mapping apparatus for the same are provided. The apparatus for searching a rights object includes a transmitting/receiving unit which transmits at least one from a rights object identifier, content identifier list and a rights object to a portable storage device, and a searching unit which searches, from mapping information located in the portable storage device stored with the rights object identifier mapped with the content identifier from the content identifier list, the rights object identifier corresponding to the content identifier by using the content identifier as a search key, and retrieves the rights object stored in a rights slot corresponding to the searched rights object identifier.

17 Claims, 8 Drawing Sheets

METHOD AND APPARATUS FOR SEARCHING RIGHTS OBJECT AND MAPPING METHOD AND MAPPING APPARATUS FOR THE SAME

This application claims priority from U.S. Provisional Patent Application No. 60/799,652 filed on May 12, 2006 in the United States Patent and Trademark Office and Korean Patent Application No. 10-2007-0041399 filed on Apr. 27, 2007 in the Korean Intellectual Property Office, the disclosures of which are incorporated herein by reference in their entirety.

BACKGROUND OF THE INVENTION

1. Field of the Invention

The present invention relates to a method and apparatus for searching a rights object and a mapping method and mapping apparatus for the same, and more particularly, to a method and apparatus for searching a rights object and a mapping method and mapping apparatus for the same, in which a rights object ID and a content ID are mapped and managed to increase the efficiency of search for a rights object.

2. Description of the Related Art

Recently, digital rights management (hereinafter referred to as "DRM") has been researched actively, and commercial services using DRM have already been implemented or will be implemented. DRM is a technical concept to protect digital content that can be readily copied and distributed without permission.

Although efforts have been made to protect digital content, conventional digital content protection has focused mainly on preventing unauthorized access to digital content. Specifically, only those people who have paid fees are permitted to access the digital content, and those who have not paid the charges are denied access to the digital content. However, the digital content can be readily copied, reused, processed and distributed to third parties due to the characteristics of the digital data.

Accordingly, when a person who has paid the fees accesses the digital content and intentionally distributes it to a third party, the third party can use the digital content without paying the fees, which has produced a number of problems. In order to solve these problems, in DRM, the digital content is encrypted and distributed, and a specified license called a rights object (RO) is needed to use the encrypted digital content.

However, a rights object stored in host devices can be readily transferred and copied on portable storage devices. Overcoming limitations of conventional storage devices such as hard disks and compact disks, portable storage devices such as XD cards and multimedia cards, which can easily be connected and disconnected from host devices such as mobile phones, computers and digital cameras, can carry out data control and computing functions in addition to data storage. Further, new portable storage devices having security functions for use with the above-described portable storage devices are being developed, in which copyrighted digital content can be protected by securing content during transmission and storage. Accordingly, it is possible to implement DRM between a portable storage device and a host device. That is, a rights object can be stored in the portable storage device, and the host device can regenerate encrypted digital content using the rights object stored in the portable storage device.

FIG. 1 is a conceptual diagram of a method of installing a conventional rights object.

A host device sends a rights object identifier (RID) to a portable storage device to store a rights object (S11). RID is usually included in the rights object and serves as a unique identifier for the rights object.

After receiving the RID, the portable storage device allocates a rights slot and sends a response to the host device (S13). The host device then transmits a rights object to the portable storage device (S15).

Thereafter, the portable storage device stores the rights object in the allocated rights slot with the RID serving as a search key (S17). Here, the RID is used as a unique identifier for allocating a memory space for the rights object. When the RID is used as a search key, a hash value having a specific length of 20 bytes or a value of a specific attached string is used as a search key.

Meanwhile, host devices can use a content identifier (CID) or RID to search for a corresponding rights object stored in a conventional portable storage device. CID is usually included in the rights object and serves as a unique identifier for content.

In the case of performing a search by using a rights object identifier, the host device searches a memory space corresponding to the rights object identifier to retrieve the rights object stored in the searched memory space.

In the case of performing a search by using a content identifier, the host device searches for content identifiers in all of the rights objects to retrieve the rights object corresponding to the content identifier.

Accordingly, when searching for a rights object by using a content identifier, content identifiers in the rights objects must be parsed and searched in a comparative manner. As a result, the cost of parsing increases and the search speed decreases. Further, there is a problem of regenerating content in real time due to the delayed response time.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a method and apparatus for searching a rights object and a mapping method and mapping apparatus for the same, to effectively search a rights object.

According to an aspect of the present invention, there is provided an apparatus for searching a rights object, the apparatus including: a transmitting/receiving unit which transmits at least one of a rights object identifier, content identifier list and a rights object to a portable storage device; and a searching unit which searches, from mapping information located in the portable storage device stored with the rights object identifier mapped with the content identifier from the content identifier list, the rights object identifier corresponding to the content identifier by using the content identifier as a search key, and which retrieves the rights object stored in a rights slot corresponding to the searched rights object identifier.

According to another aspect of the present invention, there is provided a mapping apparatus for searching a rights object, the mapping apparatus including: a transmitting/receiving unit which receives at least one of a rights object identifier, a content identifier list and a rights object from a host device; and a mapping unit which maps the content identifier and the rights object identifier to correspond to each other by using the content identifier from the content identifier list as a search key.

According to another aspect of the present invention, there is provided a method of searching rights object, the method including: transmitting at least one of a rights object identifier, a content identifier list and a rights object to a portable storage device; and searching, from mapping information located in the portable storage device having stored with the rights object identifier mapped with the content identifier from the content identifier list, the rights object identifier corresponding to the content identifier by using the content identifier as a search key, and retrieving the rights object stored in a rights slot corresponding to the searched rights object identifier.

According to another aspect of the invention, there is provided a mapping method for searching a rights object, the method including: receiving at least one of a rights object identifier, content identifier list and a rights object from a host device; and mapping the content identifier and the rights object identifier to correspond to each other by using the content identifier from the content identifier list as a search key.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF EXEMPLARY EMBODIMENTS

Figure 1:
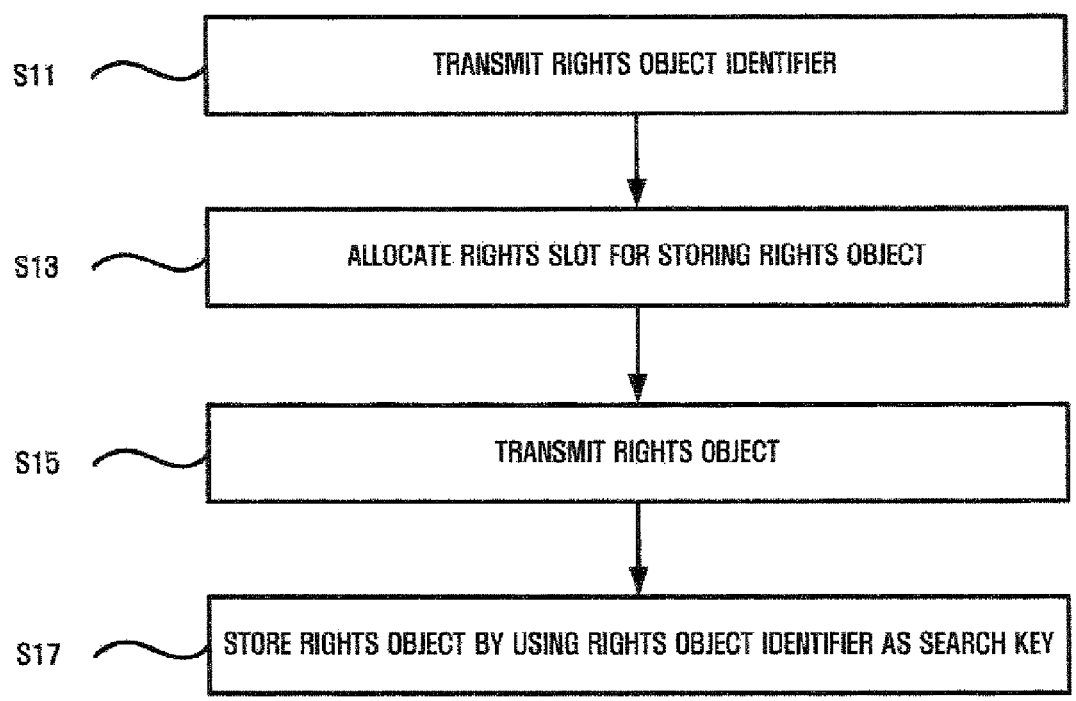
FIG. 1 is a conceptual diagram of a method of installing a conventional rights object.

The various aspects and features of the present invention and methods of accomplishing the same may be understood more readily by reference to the following detailed description of exemplary preferred embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

The present invention will hereinafter be described in detail with reference to the accompanying drawings.

First, terms used herein will be described briefly. However the description of the terms is provided for a better understanding of the present description, and it should be noted that this description is not intended to limit the scope of the technical sprit of the present invention.

Rights Object

The rights object refers to a type of license having authorization to use encrypted content. Such an authorization includes "play, display, execute, print, export (copy/transfer), and read." The rights object can be exemplified through various methods and languages such as XML, WBXML, and binary formats. In the present invention, the rights objects may be those defined by Open Mobile Alliance Digital Rights Management (OMA DRM), for example, but the invention is not limited to this.

Portable Storage Device

The portable storage device used in the present invention includes, for example, a non-volatile memory with the properties of being readable, writable and erasable, like a flash memory, has specified data operations, and is a storage device that can be connected and disconnected from a host device. Examples of such a storage device include smart media, memory sticks, compact flash (CF) cards, XD cards, and multimedia cards. In the present invention, the portable storage device may be a multimedia card having a specified security function.

Host Device

The host device used in the present invention refers to a multimedia device which can be connected to the portable storage device and regenerate encrypted content through a rights object stored in the portable storage device. Examples of such a host device include portable devices such as mobile phones, PDAs and MP3 players, and non-portable devices such as desktop computers and digital TVs.

Figure 2:
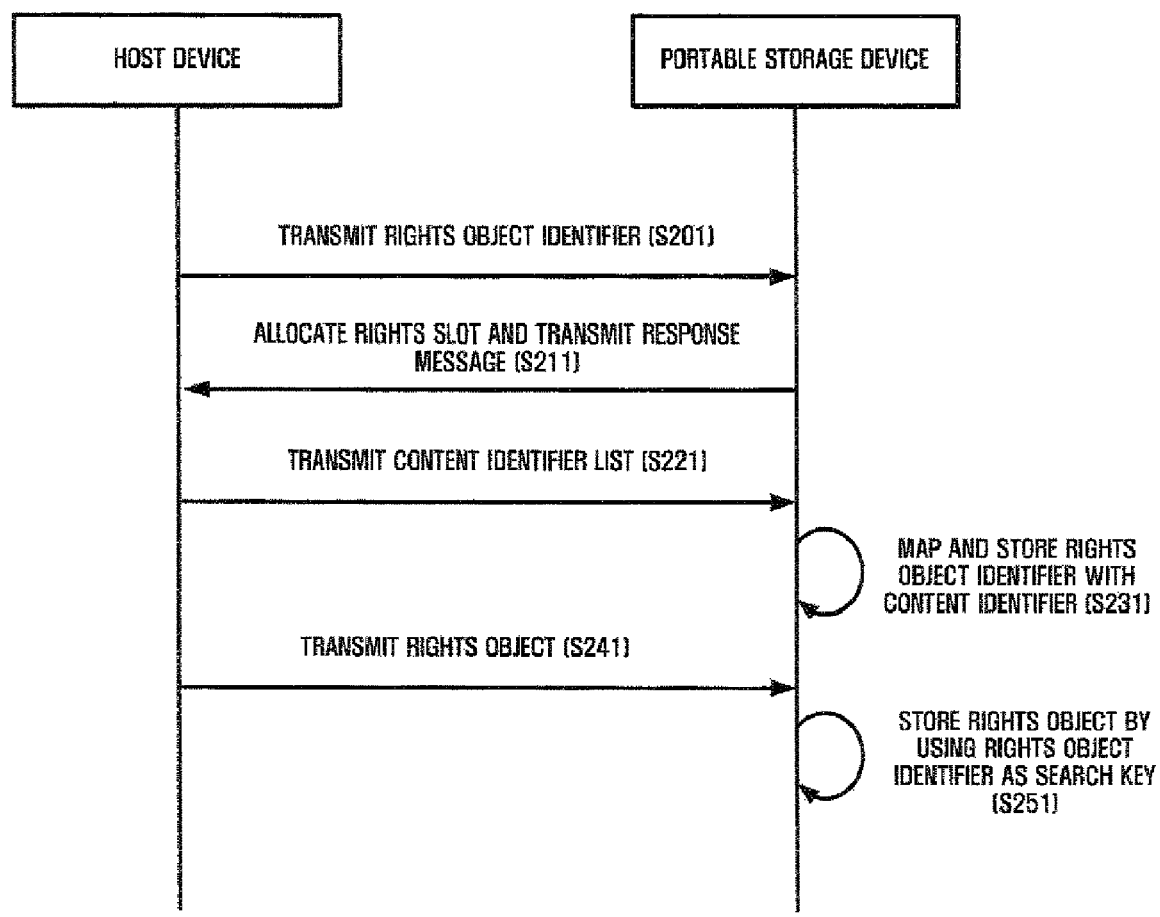
FIG. 2 is a flowchart illustrating a method of mapping and storing a rights object identifier and a content identifier, according to an exemplary embodiment of the present invention.

FIG. 2 is a flowchart illustrating a method of mapping and storing rights object identifiers and content identifiers, according to an exemplary embodiment of the present invention.

A host device transmits a rights object identifier (RID) to a portable storage device to store a rights object (operation S201). A rights object identifier is usually included in the rights object and serves as a unique identifier for the rights object.

After receiving the rights object identifier, the portable storage device allocates a rights slot and sends a response to the host device (operation S211). Here, the rights slot can be distinguished by the rights object identifier.

Figure 3:
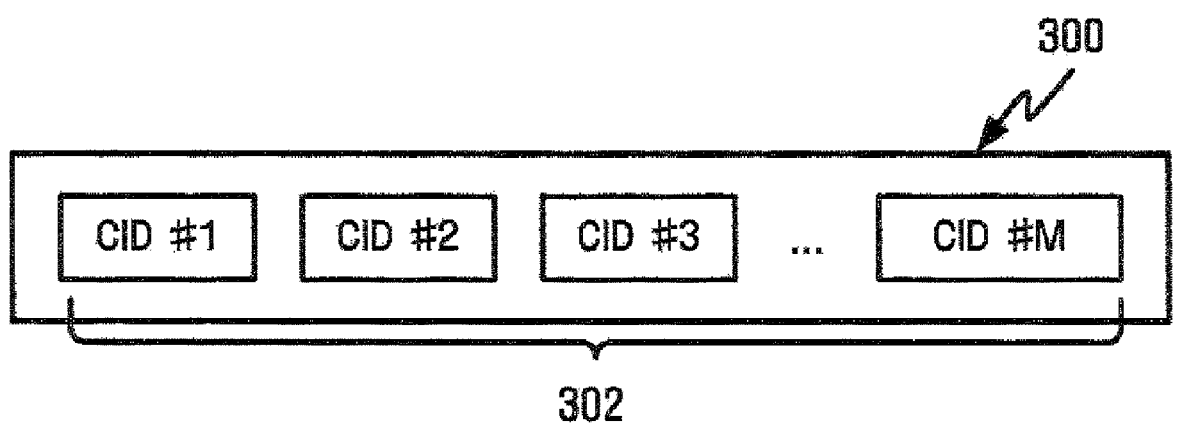
FIG. 3 illustrates an example of a content identifier list, according to an exemplary embodiment of the present invention.

Then, the host device generates and transmits a list of content identifiers (LCID) to the portable storage device (operation S221). FIG. 3 illustrates an example of a list of content identifiers.

Figure 4:
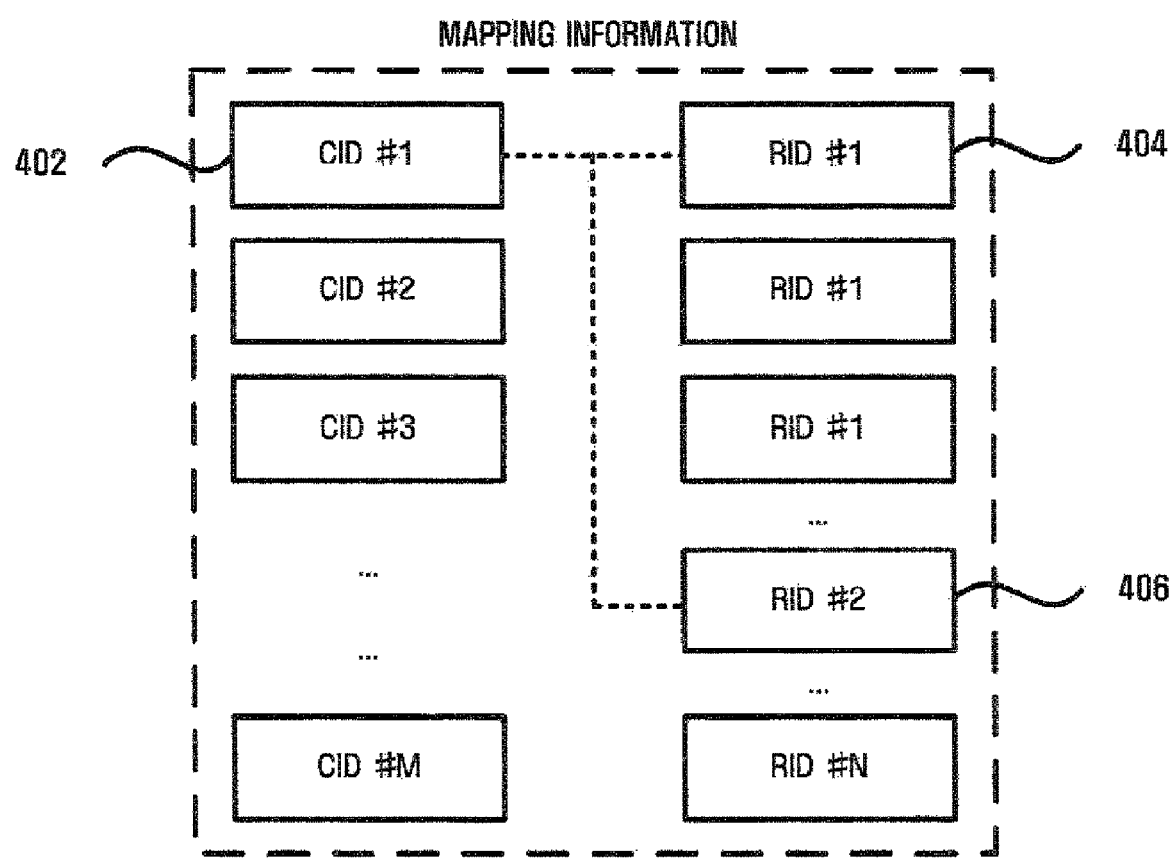
FIG. 4 illustrates mapping information of mapped content identifiers and rights object identifiers, according to an exemplary embodiment of the present invention.

Next, the portable storage device maps and stores the content identifiers and the rights object identifier (operation S231). Here, the content identifiers and the rights object identifiers may be mapped by using the content identifiers from the list of content identifiers as search keys. If there exists mapping information on the previously mapped content identifiers and rights object identifiers, the list of content identifiers may be used to update the mapping information. FIG. 4 illustrates an example of mapped content identifiers and rights object identifiers.

Next, the host device transmits the rights object to the portable storage device (operation S241).

Then, the portable storage device stores the rights object in a rights slot by using the rights object identifier as a search key. Here, if the rights object identifier is used as a search key, the rights object can be retrieved from the rights slot corresponding to the rights object identifier. FIGS. 3 to 6 illustrate a method of searching a rights object.

In the above, the rights object identifier, content identifier list and the rights object may be transmitted to the portable storage device all at one time or may be divided and transmitted in more than two transmissions. Here, the time of transmission is not limited any particular point of time.

FIG. 3 illustrates an example of a content identifier list, according to an exemplary embodiment of the present invention, and FIG. 4 illustrates mapping information of mapped content identifiers and rights object identifiers, according to an exemplary embodiment of the present invention.

As shown in FIG. 3, a content identifier list 300 includes a plurality of content identifiers 302.

As shown in FIG. 4, after receiving the content identifier list 300, the portable storage device creates the mapping information of the rights objects mapped with the content identifiers from the content identifier list 300.

Here, as shown in FIG. 4, a rights object identifier "RID #1" 404 received from the host device may be mapped with a plurality of content identifiers from the content identifier list 300. On the other hand, the content identifier can be mapped with a plurality of rights objects identifiers. For example, a content identifier "CID #1" 402 can be mapped with a rights object identifier RID #1 404 and a rights object identifier "RID # 2" 406. In such a case, a number of users may be allowed to use the same content via a plurality of rights objects.

If the portable storage device is already stored with mapping information of the content identifiers and the rights object identifiers, the received content identifier list 300 can be used to update the mapping information. For example, when the portable storage device receives a rights object identifier "RID #N" and a content identifier list from the host device, and the rights object identifier RID #N is to be mapped with a content identifier "CID #M" from the received content identifier list which is already mapped with "RID #N−1" in the mapping information already stored in the portable storage device, the content identifier CID #M is mapped with both the rights object identifiers RID #N and RID #N−1, thereby updating the mapping information. Accordingly, when a rights object identifier is selected from a plurality of rights object identifiers mapped with the same content identifier, the rights object stored in the rights slot corresponding to the selected rights object identifier can be automatically retrieved. According to the present invention, a user interface which can enable users to directly select (a rights object identifier) may be provided.

Hereinafter, the present invention will be described in detail by referring to a conceptual diagram shown in FIG. 5.

Figure 5:
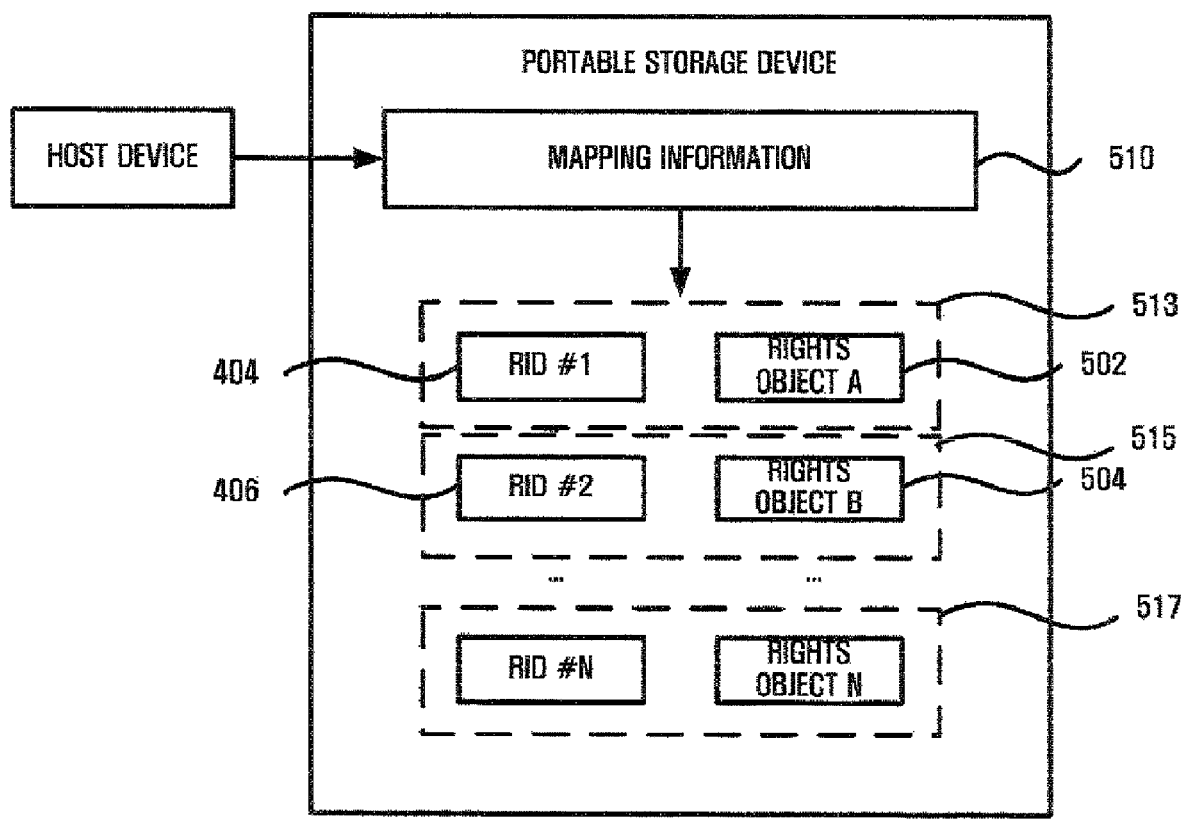
FIG. 5 is a conceptual diagram which illustrates searching of a rights object by using mapping information of rights object identifiers and content identifiers, according to an exemplary embodiment of the present invention.

FIG. 5 is a conceptual diagram which illustrates searching of a rights object by using mapping information of rights object identifiers and content identifiers, according to an exemplary embodiment of the present invention.

Mapping information 510 of the rights object identifiers and the content identifiers is stored in the portable storage device. Reference to FIG. 4 should be made for the mapping information of the rights object identifiers and the content identifiers. The rights objects corresponding to the rights object identifiers are respectively stored in rights slots 513, 515 and 517. Here, the rights slots 513, 515 and 517 can be distinguished by the rights object identifier which serves as a unique identifier for the rights slots.

The host device can search a rights object by using the rights object identifier and the content identifier, and the searched rights object is used to access content.

In the case when a rights object identifier is used to search a rights object, the host device uses the rights object identifier as a search key to retrieve the rights object from a rights slot corresponding to the rights object identifier. For example, the host device may use the rights object identifier RID #1 404 as a search key to retrieve a rights object "A" 502 from the rights slot 513 corresponding to the rights object identifier RID #1 404.

In the case when a content identifier is used to search a rights object, the host device searches a rights object identifier mapped with the content identifier from the mapping information 510. For example, the host device may use the content identifier CID #1 402 as a search key to search a rights object identifier corresponding to the content identifier CID #1 402 from the mapping information 510. If the searched rights object identifier is RID #2 406, the host device retrieves a rights object "B" 504 stored in the rights slot 515 corresponding to the rights object identifier RID #2 406.

Conventionally, when a rights object is searched by using a content identifier, all of the content identifier in the rights object must be searched, which made the process inefficient. Further, searching a content identifier from the rights object in XML or WBXML format causes a load due to parsing. However, inefficient conventional methods of searching a rights object can be improved by generating and transmitting a content identifier list to a portable storage device and by mapping and storing the content identifier list with the rights object identifiers. This makes it possible to search a rights object identifier by using the content identifiers from the mapping information without parsing the rights object as described above, and retrieve a corresponding rights object by using the searched rights object identifier.

Figure 6:
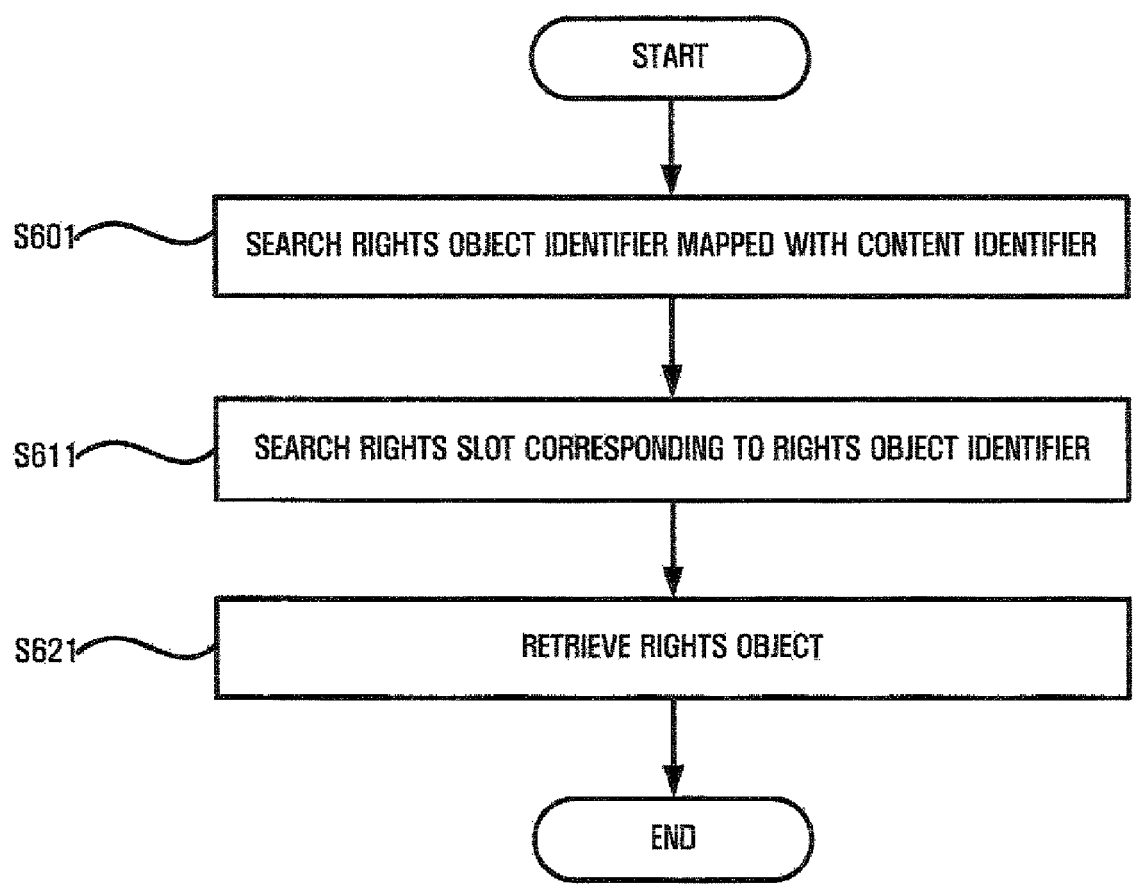
FIG. 6 is a flowchart of a method of searching a rights object, according to an exemplary embodiment of the present invention.

FIG. 6 is a flowchart of a method of searching a rights object, according to an exemplary embodiment of the present invention.

First, by using a content identifier, the host device searches a corresponding content identifier and rights object identifier from the mapping information (operation S601).

Then, a rights slot corresponding to the searched rights object identifier is searched (operation S611).

Next, a rights object from the searched rights slot is retrieved (operation S621). Reference should be made to FIGS. 3 to 5 for details.

Figure 7:
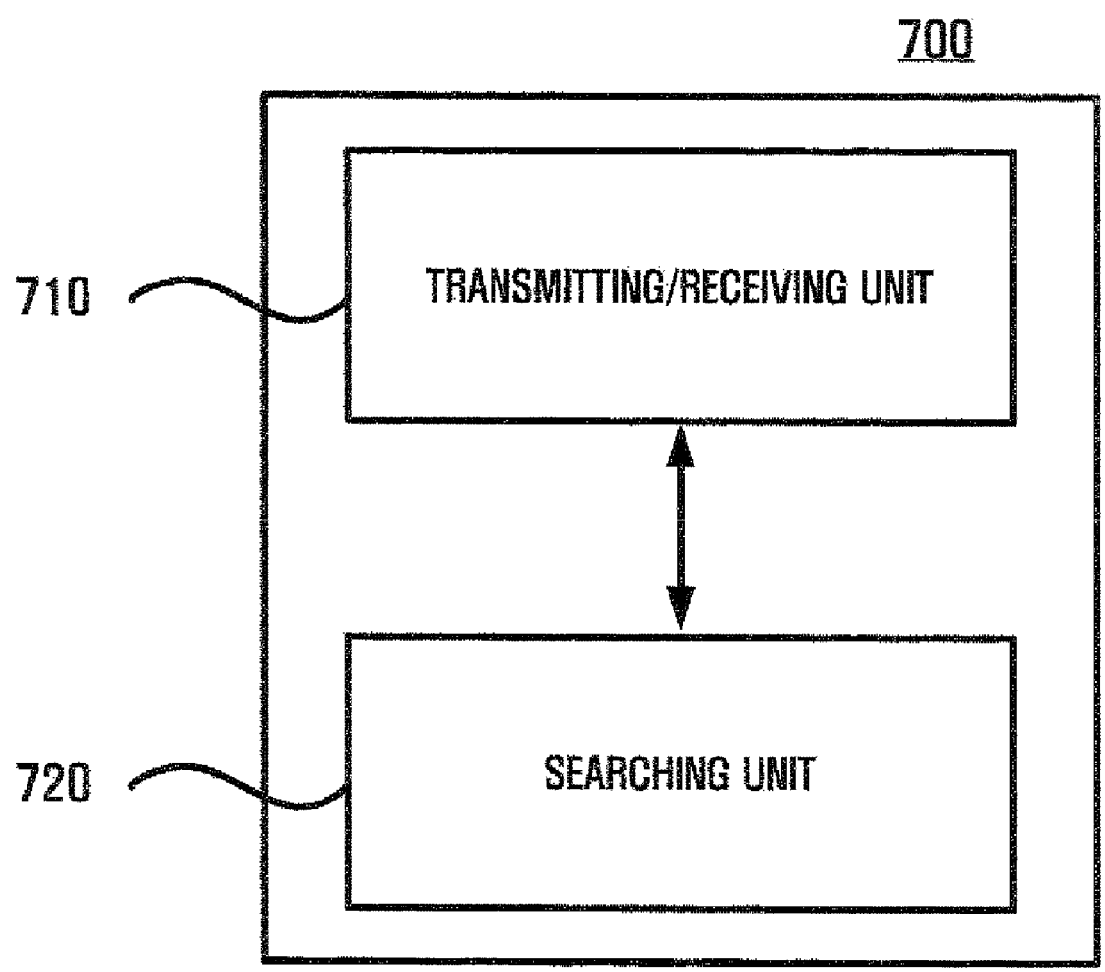
FIG. 7 is a block diagram of an apparatus for searching a rights object, according to an exemplary embodiment of the present invention.

FIG. 7 is a block diagram of an apparatus 700 for searching a rights object, according to an exemplary embodiment of the present invention.

The apparatus 700 includes a transmitting/receiving unit 710 and a searching unit 720, and may be provided in the host device.

The transmitting/receiving unit 710 transmits and receives data between the host device and the portable storage device, and may transmit a rights object identifier, a content identifier list and a rights object to the portable storage device. Here, the rights object identifier, content identifier list and the rights object may be transmitted all at one time or may be divided and transmitted more than twice. The time of transmission is not limited any particular point of time. The transmitting/receiving unit 710 may include an interface unit (not shown). The interface unit enables the host device to be connected to the portable storage device.

The searching unit 720 searches a rights object stored in the portable storage device by using a rights object identifier or a content identifier, and retrieves the searched rights object via the transmitting/receiving unit 710. In the case of searching the rights object by using the content identifier, the searching unit 720 searches a rights object identifier mapped with the content identifier, and retrieves a rights object corresponding to the searched rights object identifier by using the rights object identifier as a search key. Similarly, by using the content identifier as a search key, a corresponding rights object identifier can be searched from the mapping information, and a rights object stored in a rights slot can be retrieved by using the searched rights object identifier as a search key. In the case when the content identifier is mapped with a plurality of rights object identifiers, one rights object identifier can be selected. Reference should be made to FIGS. 2 to 6 for details.

Figure 8:
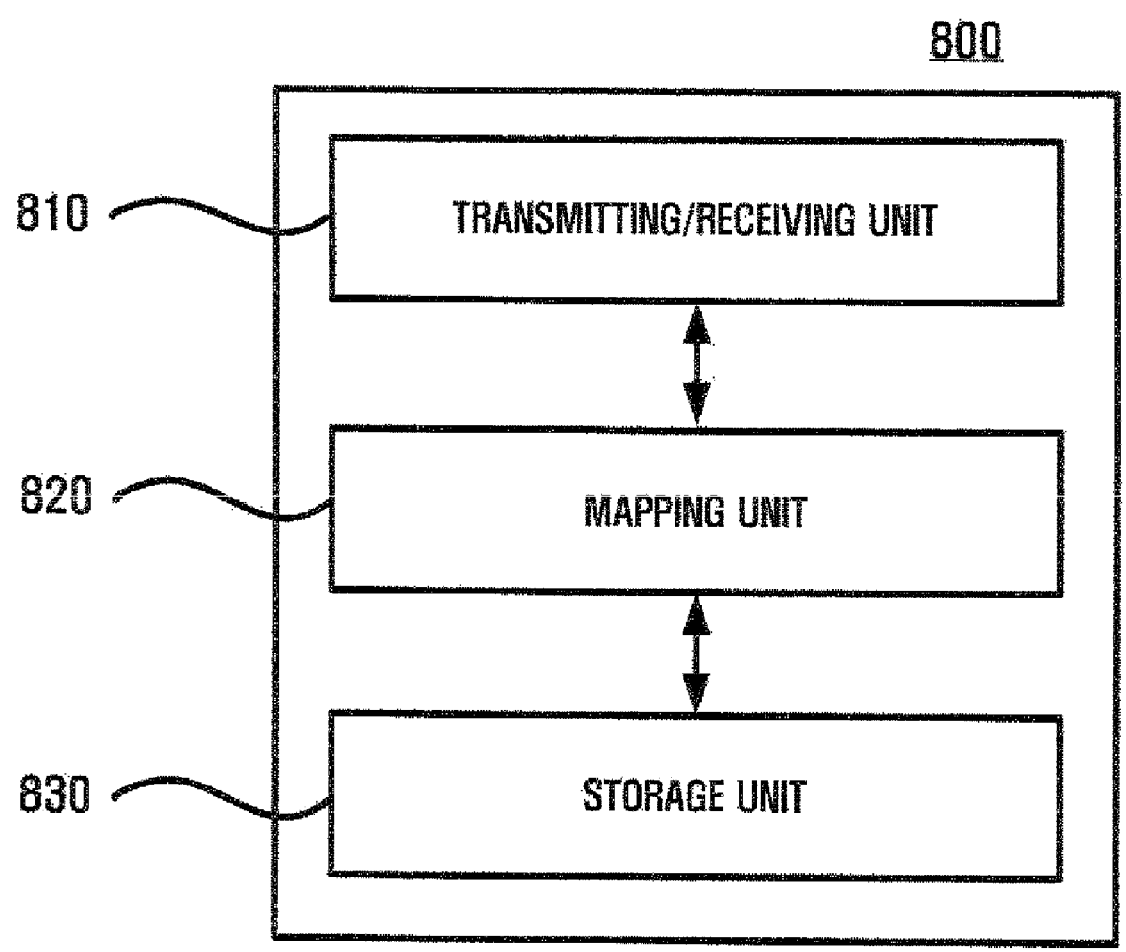
FIG. 8 is a block diagram of a mapping apparatus for searching a rights object, according to an exemplary embodiment of the present invention.

FIG. 8 is a block diagram of a mapping apparatus 800 for searching a rights object, according to an exemplary embodiment of the present invention.

The mapping apparatus 800 includes a transmitting/receiving unit 810, a mapping unit 820 and a storage unit 830, and may be provided in the portable storage device.

The transmitting/receiving unit 810 transmits and receives data between the host device and the portable storage device. That is, the transmitting/receiving unit 810 can receive a rights object identifier, content identifier list and a rights object from the host device, and transmit a rights object and a response message to the host device.

The mapping unit 820 maps the content identifier with the rights object identifier. That is, when a content identifier list is received from the host device, the mapping unit 820 maps the rights object identifiers with the content identifiers from the content identifier list to correspond to each other. Here, the content identifier can be used as a search key. If the portable storage device is already stored with mapping information of the content identifiers and the rights object identifiers, the mapping information can be updated by receiving the content identifier list. The content identifiers and the rights object identifiers can be mapped by various mapping methods, and the present invention is not limited to any one method. The mapping information of the content identifiers mapped with the rights object identifiers can be stored in a database format.

The storage unit 830 stores the mapping information of the content identifiers mapped with the rights object identifiers. Additionally, the storage unit 830 stores a rights object corresponding to a rights object identifier in a rights slot by using the rights object identifier as a search key. As already described, the mapping information and the rights objects stored in the storage unit 830 can be updated. Reference should be made to FIGS. 2 to 6 for details.

Each component shown in FIGS. 7 and 8 can be realized in various configurations depending on a method of implementing the component. For example, the searching unit 720 can be provided in the mapping apparatus 800. In this configuration, the mapping apparatus 800 performs the operation of the searching unit 720.

Also, each component shown in FIGS. 7 and 8 can be implemented with a module. As used herein, the "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

The method and apparatus for searching a rights object and the mapping method and mapping apparatus for the same, according to the exemplary embodiments of the present invention as described above, may provide the following advantages.

A rights object can be searched efficiently using a content identifier, and the rate at which content can be regenerated in real time can be increased.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for searching a rights object, the apparatus comprising:
    a transmitting/receiving unit which transmits at least one of a rights object identifier, content identifier list and a rights object to a portable storage device; and
    a searching unit, executed in a computing device, which if the content identifier is input as a search key, searches in mapping information comprising a list of a plurality of mapping identifier sets located in the portable storage device stored separately from the rights object, for a corresponding rights object identifier that is mapped with the content identifier from the content identifier list, and retrieves the rights object stored in a rights slot corresponding to the searched rights object identifier.

2. The apparatus of claim 1, wherein the rights object identifier, content identifier list and the rights object are transmitted to the portable storage device all at one time or are divided and transmitted by more than two transmissions.

3. The apparatus of claim 1, wherein the searching unit searches and retrieves the rights object from the rights slot corresponding to the rights object identifier, if the rights object is retrieved by using the rights object identifier as a search key.

4. The apparatus of claim 1, wherein the searching unit selects one rights object identifier, if a plurality of rights object identifiers is mapped with the content identifier.

5. A mapping apparatus for searching a rights object, the apparatus comprising:
    a transmitting/receiving unit which receives at least one of a rights object identifier, content identifier list and a rights object from a host device; and
    a mapping unit, executed in a computing device, which maps the content identifier and the rights object identifier to correspond to each other by using the content identifier from the content identifier list as a search key, wherein mapping information comprising a list of a plurality of mapping identifier sets generated by the mapping unit is stored separately from the rights object such that the rights object is found using the rights object identifier obtained after matching the rights object identifier to input content identifier.

6. The mapping apparatus of claim 5, wherein the rights object is stored in a rights slot by using the rights object identifier as a search key.

7. The mapping apparatus of claim 5, wherein the mapped information and the rights object are updated according to the rights object identifier, content identifier list and the rights object received from the host device.

8. A method of searching rights object, the method comprising:
transmitting at least one of a rights object identifier, content identifier list and a rights object to a portable storage device; and
searching, by a computing device, mapping information comprising a list of plurality of mapping identifier sets located in the portable storage device stored separately from the rights object, for a corresponding rights object identifier that is mapped with the content identifier from the content identifier list if the content identifier is input as a search key, and retrieving the rights object stored in a rights slot corresponding to the searched rights object identifier.

9. The method of claim 8, wherein the rights object identifier, content identifier list and the rights object are transmitted to the portable storage device all at one time or are divided and transmitted by more than two transmissions.

10. The method of claim 8, wherein the retrieving the rights object comprises searching and retrieving the rights object from the rights slot corresponding to the rights object identifier, if the rights object is retrieved by using the rights object identifier as a search key.

11. The method of claim 8, wherein the retrieving the rights object comprises selecting one rights object identifier, if a plurality of rights object identifiers is mapped with the content identifier.

12. The method of claim 8, wherein:
the mapping information links the content identifier with at least two rights object identifiers,
rights objects are stored in the portable storage device in respective rights slots, and
the rights objects are retrieved from the respective rights slots using the rights object identifiers if the search key is the content identifier.

13. The method of claim 8, further comprising: determining at least one rights object identifier that corresponds to the input content identifier, determining rights objects based on the determined rights object identifier, and retrieving the determined rights objects.

14. The method of claim 8, wherein the input content identifier is mapped to at least one rights object identifier and retrieving the rights object based on the at least one mapped rights object identifier instead of the input content identifier.

15. A mapping method for searching rights object, the method comprising:
receiving at least one of a rights object identifier, content identifier list and a rights object from a host device; and
mapping, by a computing device, the content identifier and the rights object identifier to correspond to each other by using the content identifier from the content identifier list as a search key thereby generating mapping information comprising a list of plurality of mapping identifier sets,
wherein the generated mapping information is stored separately from the rights object such that the rights object is found using the rights object identifier obtained after matching the rights object identifier to input content identifier.

16. The mapping method of claim 15, further comprising storing the rights object in a rights slot by using the rights object identifier as a search key.

17. The mapping method of claim 15, further comprising updating the mapping information and the rights object according to the rights object identifier, content identifier list and the rights object received from the host device.

* * * * *